US008518361B2

(12) United States Patent
Chang et al.

(10) Patent No.: US 8,518,361 B2
(45) Date of Patent: Aug. 27, 2013

(54) METHOD OF PREPARING HIGHLY ORDERED MESOPOROUS SILICA NANOPARTICLES USING THE ADDITION OF TRANSITION METAL SALTS

(75) Inventors: Jeong-Ho Chang, Gyeonggi-do (KR); Jin Hyung Lee, Gyeonggi-do (KR); Hye Sun Lee, Seoul (KR)

(73) Assignee: Korea Institute of Ceramic Engineering and Technology, Seoul (KR)

( * ) Notice: Subject to any disclaimer, the term of this patent is extended or adjusted under 35 U.S.C. 154(b) by 468 days.

(21) Appl. No.: 12/627,381

(22) Filed: Nov. 30, 2009

(65) Prior Publication Data

US 2010/0304139 A1 Dec. 2, 2010

(30) Foreign Application Priority Data

May 27, 2009 (KR) ........................ 10-2009-0046589

(51) Int. Cl.
*C01B 33/12* (2006.01)

(52) U.S. Cl.
USPC ............................ 423/335; 977/773; 977/775

(58) Field of Classification Search
USPC .......................... 423/335; 977/773, 775, 776
See application file for complete search history.

(56) References Cited

U.S. PATENT DOCUMENTS 6,096,469 A * 8/2000 Anderson et al. ............. 427/256

OTHER PUBLICATIONS

Lai, C.Y., Trewyn, B.G., Jeftinija, D.M., Jeftinija, K., Xu, S., Jeftinija, S., Lin, V.S.Y. "A Mesoporous Silica Nanosphere-Based Carrier System with Chemically Removable CdS Nanoparticle Caps for Stimuli-Responsive Controlled Release of Neurotransmitters and Drug Molecules." J. Am. Chem. Soc. 125 (2003): 4451-4459.*

Lin, V.S.Y., Lai, C.Y., Huang, J., Song, S.A., Xu, S. "Molecular Recognition Inside of Multifunctionalized Mesoporous Silicas: Toward Selective Fluorescence Detection of Dopamine and Glucosamine." J. Am. Chem. Soc. 123 (2001): 11510-11511.*

Slowing, I.I., Trewyn, B.G., Giri, S., Lin, V.S.Y. "Mesoporous Silica Nanoparticles or Drug Delivery and Biosensing Applications." Adv. Funct. Mater. 17 (2007): 1225-1236.*

Ying Li, Zhaochi Feng, Yuxiang Lian, Keqiang Sun, Lei Zhang, Guoqing Jia, Qihua Yang, Can Li, Direct synthesis of highly ordered Fe-SBA-15 mesoporous materials under weak acidic conditions, Microporous and Mesoporous Materials, vol. 84, Issues 1-3, Sep. 15, 2005, pp. 41-49, ISSN 1387-1811, 10.1016/j.micromeso.2005.05.021.*

Hydrothermal and Postsynthesis Surface Modification of Cubic, MCM-48, and Ultralarge Pore SBA-15 Mesoporous Silica with Titanium Mark S. Morey,†, Stephen O'Brien,†, Stephan Schwarz,‡ and, and Galen D. Stucky*,† Chemistry of Materials 2000 12 (4), 898-911.*

"Autoclave Definition"—The Free Dictionary (C) 2000. http://www.thefreedictionary.com/autoclave Accessed Mar. 14, 2013.*

* cited by examiner

*Primary Examiner* — Stanley Silverman
*Assistant Examiner* — Richard M Rump
(74) *Attorney, Agent, or Firm* — LRK Patent Law Firm

(57) ABSTRACT

Disclosed is a method of preparing mesoporous silica nanoparticles using hydrothermal synthesis, including adding a transition metal when reacting a surfactant and a silica precursor. The mesoporous silica nanoparticles are high functional particles able to be used as an adsorbent, a sensor, a membrane, a catalyst and a catalyst support, thanks to their large surface area and nano-sized pores. The mesoporous silica nanoparticles are functionally advantageous in terms of increased material diffusion rate and reactivity, easy recycling after use as a catalyst and slow inactivation, compared to conventional mesoporous silica, and are prepared through a very simple process among methods of controlling the particle size of mesoporous silica to a nano size.

6 Claims, 9 Drawing Sheets

$CuCl_2$ dissolved water

TEOS

* Pluoric P123

Mesoporous Silica Nanoparticles

METHOD OF PREPARING HIGHLY ORDERED MESOPOROUS SILICA NANOPARTICLES USING THE ADDITION OF TRANSITION METAL SALTS

CROSS-REFERENCE TO RELATED APPLICATION

This application claims under 35 U.S.C. §119(a) the benefit of Korean Application No. 10-2009-0046589 filed May 27, 2009, the entire contents of which are incorporated herein by reference.

BACKGROUND OF THE INVENTION

1. Field of the Invention

The present invention relates to a method of preparing highly ordered mesoporous silica nanoparticles, which when compared to conventional porous silicas are superior in diffusion rate and reactivity, are capable of being more easily recycled after having been used as the catalysts, solid suppoters and become inactivated more slowly.

2. Description of the Related Art

Porous material mainly is used as a catalyst or solid supporter because of its large surface area. Such a porous material is classified depending on its pore size into the microporous materials having pores less than 2 nm, the mesoporous materials having pores of 2-50 nm, and the macroporous materials having pores exceeding 50 nm. Synthesis of a series of mesoporous materials including MCM-41 and MCM-48 called the M41 family by researchers of Mobile Corporation and in 1992 was published. Also, a mesoporous material known as SBA-15 is being independently synthesized from a layer material similar to MCM-41 by researchers at Santa Barbara. These mesoporous materials have mesopores regularly arranged with a uniform pore diameter of 2-10 nm, have a large surface area (700-1500 $m^2/g$), and have chemical and thermal stability. Because the mesoporous material acting as a porous molecular sieve material has fine pores having a uniform size and which are regularly arranged, it is able to selectively separate and adsorb materials at the molecular level. Moreover, the mesoporous material is very advantageous in terms of enabling the control of a molecule within the pores thereof, and thus it has been widely utilized to function as a catalyst or a catalyst support in chemical reactions. In addition, there are methods of synthesizing other types of mesoporous materials such as MSU, FSM and so on. Most mesoporous materials have a particle size in the micro scale. In recent research related thereto, mesoporous silica nanoparticles which are regularly arranged and in which the shape of the particles may be controlled have been synthesized.

A method of preparing the highly ordered mesoporous silica nanoparticles containing having platinum nanoparticles incorporated therein was published in 2004. This method is carried out in a manner such that platinum nanoparticles are synthesized in the presence of polypyrrolidone (PVP) and dispersed in ethanol, in which a sol-gel reaction of a silica precursor for example tetraethylorthosilicate (TEOS) is then induced in the presence of a surfactant for example cetyltrimethylammonium bromide (CTAB), after which the CTAB is removed, thus synthesizing mesoporous silica nanoparticles having platinum nanoparticles incorporated in the central portions thereof. In addition, a method of preparing mesoporous silica nanoparticles has been devised, which includes forming a mesoporous silica coating layer around hematite having a size of about 150 nm synthesized in an aqueous solution phase, and reducing hematite using hydrogen, thereby synthesizing mesoporous silica nanoparticles in which magnetic particles are incorporated in the silica coating layer thereof. In addition, Victor Lin who is an Iowa State University Professor synthesized mesoporous silica nanoparticles using a synthesis method different from the above and which enables the size of the particles to be more simply controlled.

In accordance with the synthesis method of Professor Victor Lin based on the MCM-41 method, nano-sized mesoporous silica nanoparticles are prepared in such a way that TEOS is added with the use of a surfactant for example CTAB and an ionic functional group for example organotrimethoxysilane in a basic atmosphere so that a sol-gel reaction occurs. The synthesis method for preparing the nanoparticles used in the present research is based on the SBA-15 discovered by researchers at Santa Barbara. Through room-temperature synthesis rather than relatively difficult high-temperature synthesis, nanoparticles which are rapidly and systematically arranged may be obtained. The aforementioned three methods are problematic in that only the part of the nanoparticles prepared in the aqueous solution or ethanol phase may be limitedly used to produce mesoporous silica nanoparticles. Furthermore, in the case where the nanoparticles are prepared in the organic solvent at high temperature, it is difficult to synthesize mesoporous silica nanoparticles having nanoparticles incorporated therein. This is because the sol-gel reaction of the silica precursor should be induced in the aqueous solution phase to form the mesoporous silica coating layer around the nanoparticles synthesized in the organic solvent, but the nanoparticles synthesized in the organic solvent have a hydrophobic surface and are dispersed in the non-polar organic solvent, thus making it difficult to disperse them again in the polar aqueous solution.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention intends to provide a method of preparing the highly ordered mesoporous silica nanoparticles, which have a large surface area and molecular- or nano-sized pores, and thus are capable of being used as an adsorbent, a gas storage material, a sensor, a membrane, a catalyst and a catalyst support and also of being employed to incorporate guest molecules smaller than the size of the pores thereof or separate molecules using the pores, based on the fact that the rates of diffusion and reaction of a material are increased in inverse proportion to a decrease in the particle size of a porous material.

An aspect of the present invention provides a method of preparing mesoporous silica nanoparticles using hydrothermal synthesis, including adding a transition metal when reacting a surfactant and a silica precursor.

In this aspect, the transition metal may be one or more selected from the group consisting of titanium, vanadium, chromium, manganese, iron, cobalt, nickel, copper and zinc.

In this aspect, the surfactant may be a poly(alkyleneoxide) block copolymer.

In this aspect, the silica precursor may be tetraethylorthosilicate.

In this aspect, reacting the surfactant and the silica precursor may be performed at 30-50° C.

In this aspect, the method may include mixing Pluronic P123, water and an acid thus preparing a mixture solution; adding a transition metal salt to the mixture solution and mixing them thus preparing a transition metal salt-added mixture solution; adding tetraethylorthosilicate to the transition metal salt-added mixture solution and mixing them thus preparing a tetraethylorthosilicate-added mixture solution; and subjecting the tetraethylorthosilicate-added mixture solution to aging, drying and calcination.

Another aspect of the present invention provides mesoporous silica nanoparticles, prepared using the above method and having an average pore size of 2-50 nm and an average particle size of 100-900 nm.

BRIEF DESCRIPTION OF THE DRAWINGS

The features and advantages of the present invention will be more clearly understood from the following detailed description taken in conjunction with the accompanying drawings, in which.

DETAILED DESCRIPTION OF EMBODIMENTS

Figure 1:
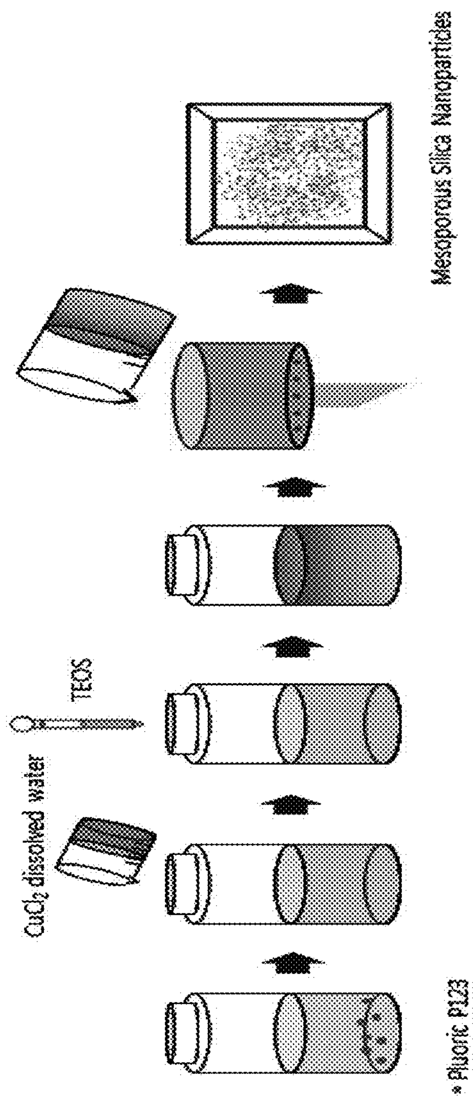
FIG. 1 is a schematic view showing a process of preparing metal salt-added mesoporous silica according to an embodiment of the present invention.

According to the present invention, mesoporous silica nanoparticles are formed by performing a sol-gel process of hydrolysis/condensation of silica through hydrothermal synthesis at high temperature using water as a solvent. In particular, a transition metal salt is added when reacting a surfactant and a silica precursor, thereby forming nano-sized mesoporous silica nanoparticles.

The mesoporous silica nanoparticles according to the present invention are a mesoporous molecular sieve in which mesopores having a uniform size are regularly arranged, and are a porous material having uniform pores, with an average pore size of 2-50 nm and preferably 2-20 nm, and an average particle size of 100-500 nm and preferably 300-400 nm.

According to a preferred embodiment of the present invention, in order to prepare uniform nano-sized porous (mesoporous) silica, the surfactant is mixed with water and then added with an acid and thus dissolved, after which the transition metal salt and the silica precursor are added thereto. The reaction of the surfactant, the transition metal salt and the silica precursor is performed at 30-50° C. and preferably 35-45° C., with stirring. As a result of adding the silica precursor, the silica precursor infiltrates the hydrophobic portions of micelles, resulting in hydrolysis. Thereafter, an aging process is performed under heat and pressure conditions, thus forming uniform nano-sized porous silica. Specifically, when a hydrothermal synthesis reaction is carried out through aging under heat and pressure conditions, it is possible to prepare uniform nano-sized porous silica having a more uniform pore size. In this regard, according to a preferred embodiment, the aging process may be performed in a closed system using a stainless steel pressurizer (or a stainless steel bomb). In the heating procedure, pressure naturally increases. The aging temperature may be set to about 110-130° C. and preferably about 120° C.

A typical example of the surfactant useful for the preparation of the mesoporous silica includes a poly(alkyleneoxide) block copolymer, for example, polyethyleneoxide-block-(polypropyleneoxide)-polyethyleneoxide, under the trade name of Pluronic P123 available from BASE. Also, the acid acting as a catalyst is typically exemplified by hydrochloric acid. The silica precursor may include any silica precursor widely known in the art, for example,. tetraethylorthosilicate (TEOS).

To synthesize the mesoporous silica, the surfactant dissolved in an aqueous solution state should be present in a certain concentration, namely, a critical micelle concentration above which micelles are formed. In consideration thereof, in order to prepare the mesoporous silica according to the present invention, the silica precursor may be used at a ratio of about 0.01-0.02 mol (in particular, about 0.017 mol) based on 1 mol of the surfactant. Also, the amount of the added acid may be determined considering the amount of the surfactant, and preferably, may be appropriately used so that the pH of the solution for preparing mesoporous silica is maintained at about 1.0-2.0 (in particular, about 1.5).

After the aging process, typical post-treatment procedures, specifically, washing (including filtering), drying and calcination, are sequentially performed. The conditions of the post-treatment procedures are not particularly limited. Typically, the drying process may be performed at about 25-30° C. for about 24-36 hours, and the calcination process may be performed at about 117-125° C. for about 8~9 hours.

The transition metal salt added when reacting the surfactant and the silica precursor may be a nitrate, hydrochloride, acetate, sulfate, carbonate, oxide or hydroxide of one or more transition metals selected from among titanium, vanadium, chromium, manganese, iron, cobalt, nickel, copper and zinc. The metal salt added to control the particle size of the mesoporous silica to a nano size includes a transition metal having a good stability constant and that has little affect on the pore size and channel. The particle size of the mesoporous silica is affected by the stability constant of the transition metal complex added when reacting the surfactant and the silica precursor. For example, as the stability constant of the added transition metal is higher, the particle size of the mesoporous silica is decreased.

Below, the present invention may be embodied through the following description which is set forth to illustrate but is not to be construed as limiting the present invention, with reference to the appended drawings.

FIG. 1 schematically shows a series of procedures involved in controlling the size of silica using $CuCl_2$ in the synthesis of the mesoporous silica nanoparticles according to an embodiment of the present invention.

The transition metal salt compound is prepared in a solution form (using water as a solvent), and then is allowed to react with the nano-sized porous silica, thus bonding the transition metal ion to the silica. Specifically, when the transition metal salt compound is added, the metal salt may react with the hydrophilic group of the nano-sized porous silica, thereby controlling the particle size of the silica.

Figure 2:
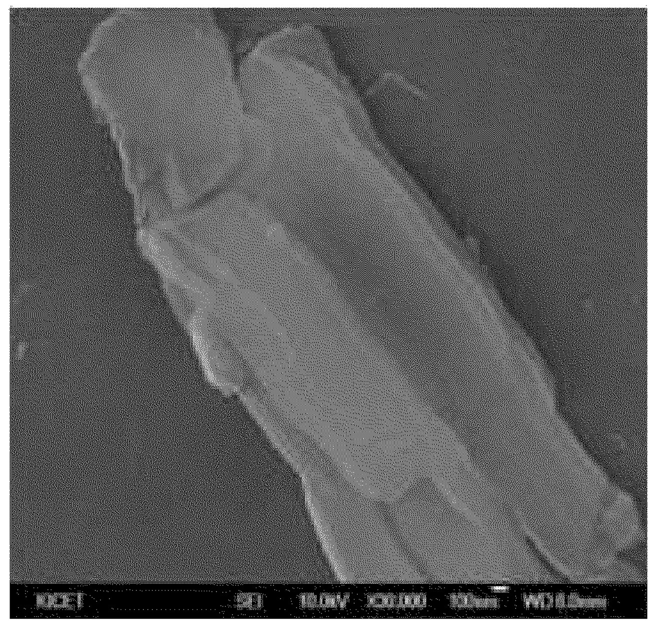
FIG. 2 is an FE-SEM image showing the particle size of mesoporous silica.
Figure 3:
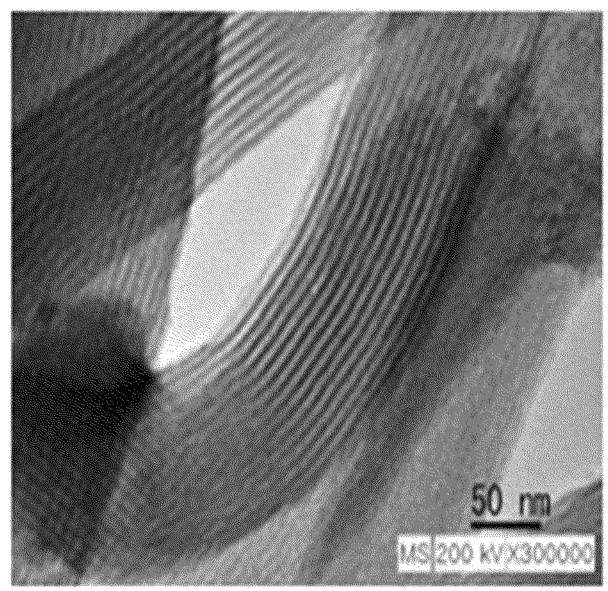
FIG. 3 is a TEM image showing the channel of the mesoporous silica.

FIGS. 2 and 3 are an FE-SEM image and a TEM image respectively showing the particle size and channel of the mesoporous

EXAMPLE 1

4.0 g of Pluronic P123, 120 g of 2 M HCl and 30 ml of water were mixed and stirred at about 40° C. for about 24 hours. Also, a 5 M Co salt was stirred in 10 ml of distilled water for 3 hours, after which this metal salt solution was added to the mixture solution of Pluronic P123, HCl and water, stirred for 6 hours, added with TEOS and then stirred at 40° C. for about 8 hours. During the stirring procedure, the solution became opaque. The opaque mesoporous silica solution was introduced into a stainless steel pressurizer which was then placed in an oven at 120° C. for 8 hours so that aging was performed. The mesoporous silica thus aged was cooled to room temperature and washed with water. The washed mesoporous silica was dried at room temperature and calcined at 550° C. for 6 hours, thus preparing mesoporous silica having fine pores.

EXAMPLE 2

Mesoporous silica was prepared in the same manner as in Example 1, with the exception that a $Ni^{2+}$ salt was used instead of the $CO^{2+}$ salt.

EXAMPLE 3

Mesoporous silica was prepared in the same manner as in Example 1, with the exception that a $Cu^{2+}$ salt was used instead of the $Co^{2+}$ salt.

EXAMPLE 4

Mesoporous silica was prepared in the same manner as in Example 1, with the exception that a $Zn^{2+}$ was used instead of the $Co^{2+}$ salt.

COMPARATIVE EXAMPLE 1

Mesoporous silica (MS) was prepared in the same manner as in Example 1, with the exception that the $Co^{2+}$ salt was not used.

EXPERIMENTAL EXAMPLE 1

BET Analysis

Figure 4:
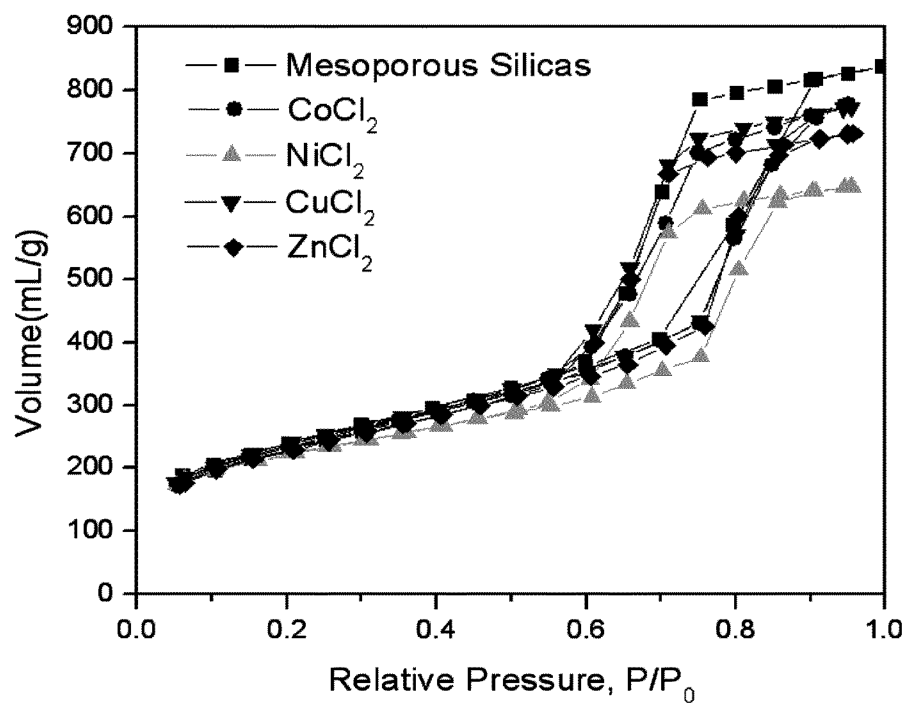
FIG. 4 is a graph showing results of BET analysis of the mesoporous silica, $Co^{2+}$-added mesoporous silica, $Ni^{2+}$-added mesoporous silica, $Cu^{2+}$-added mesoporous silica, and $Zn^{2+}$-mesoporous silica, in the examples and comparative example.

The mesoporous silicas of Examples 1 to 4 and Comparative Example 1 were subjected to BET analysis. As such, the device used for the analysis was Quantachrome Nova e-4000 Bruner-Emmet-Teller (surface area range: 0.01-2.000 $m^2/g$; Adsorption and desorption isotherm; Pore diameter range: 3.5-500 nm). The results are shown in FIG. 4. From this drawing, it can be seen that the addition of a metal salt and the type thereof do not greatly affect the pores of the mesoporous silica.

EXPERIMENTAL EXAMPLE 2

Small Angle X-ray Diffractometry

Figure 5:
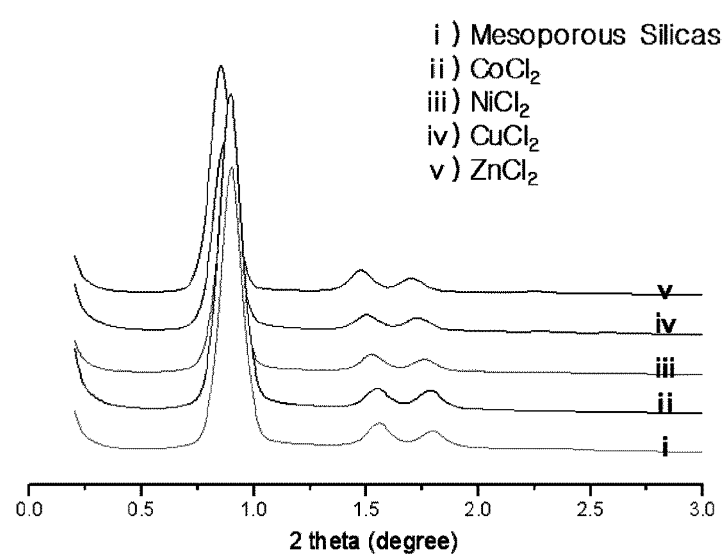
FIG. 5 is a graph showing results of small angle X-ray diffractometry of the mesoporous silicas prepared using different types of metal salts.

In order to confirm whether the $Co^{2+}$, $Ni^{2+}$, $Cu^{2+}$, $Zn^{2+}$ added when preparing the mesoporous silica in Examples 1 to 4 remained after calcination, small angle X-ray diffractometry was conducted. To this end, D/MAX-2500 (SWXD), Rigaku model was used. As a control without the addition of the metal salt, Comparative Example 1 (M.S) was used. The results are shown in FIG. 5. As is apparent from this drawing, the peak of the mesoporous silica is equal to the peak of the mesoporous silica added with $Co^{2+}$, $Ni^{2+}$, $Cu^{2+}$, $Zn^{2+}$. From this, it can be seen that the metal salt has no influence on the synthesis of the mesoporous silica nanoparticles.

EXPERIMENTAL EXAMPLE 3

XRD Analysis

Figure 6:
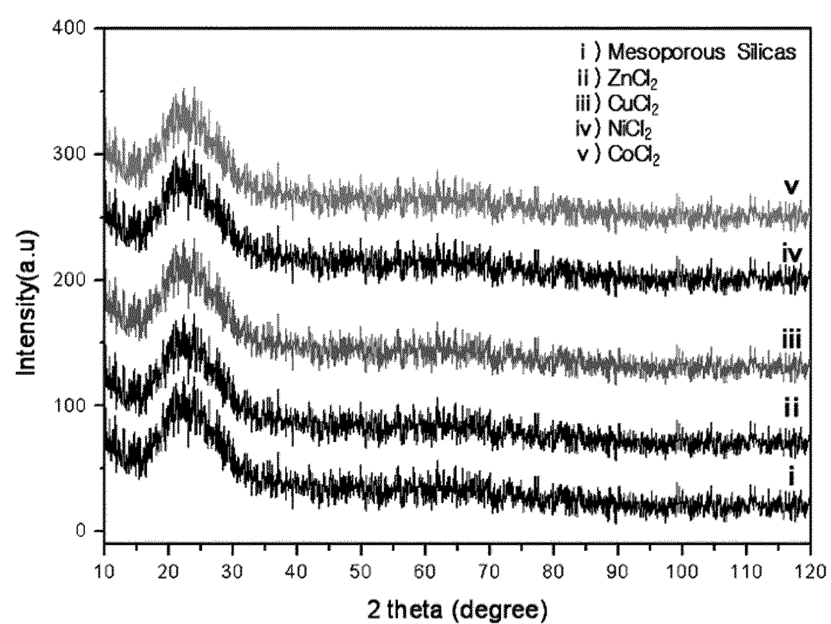
FIG. 6 is a graph showing results of XRD of the mesoporous silicas prepared using different types of metal salts.

The mesoporous silicas of Examples 1 to 4 and Comparative Example 1 were subjected to XRD analysis. As such, the device used therefor was Rigaku 2311-B (room temperature −1400° C. in a vacuum ($10^{-3}$ torr); heater in He gas: Pt wire; thermocouple; R-type). The results are shown in FIG. 6. As is apparent from this drawing, in the case of the transition metal salt-added mesoporous silica, it can be seen to form a shoulder on a broad peak at $2\theta=22$ from the typical peak of mesoporous silica as in the case where the metal salt is not added.

EXPERIMENTAL EXAMPLE 4

FE-SEM Analysis

Figure 7:
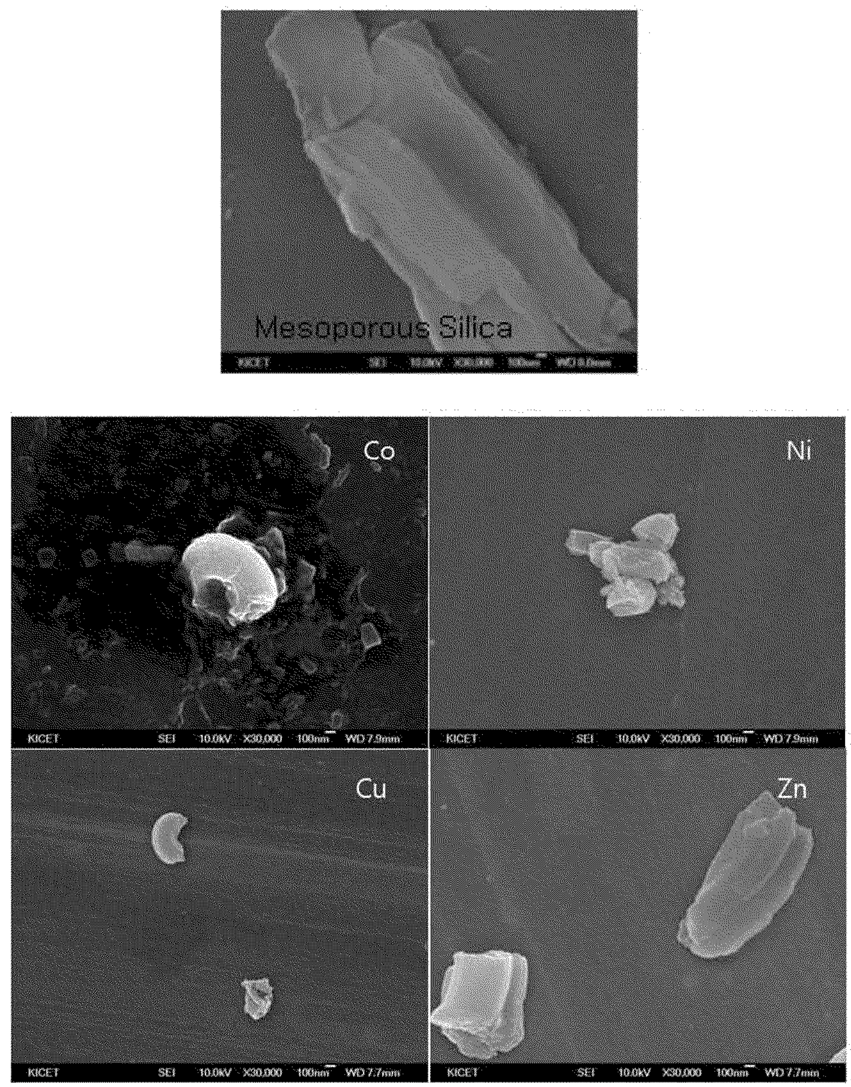
FIG. 7 is of FE-SEM images showing the particle sizes of the metal salt-added mesoporous silicas.

The mesoporous silicas of Examples 1 to 4 and Comparative Example 1 were subjected to FE-SEM analysis. As such, the device used therefor was Jeol JSM 6700F (surface coating treatment with Pt particles: 1.2 nm guaranteed at 15 kV 2.5 nm; Magnification: surface analysis at 100 kV and 200 kV). The results are shown in FIG. 7. In the drawing, the size of the mesoporous silica was about 2.5 μm, whereas the size of the mesoporous silica added with $Co^{2+}$ as the transition metal salt was about 800 nm, the size of the mesoporous silica added with $Ni^{2+}$ was about 400 nm, the size of the mesoporous silica added with $Cu^{2+}$ was about 350 nm, and the size of the mesoporous silica added with $Zn^{2+}$ was about 900 nm. Thereby, the addition of the transition metal when reacting the surfactant and the silica precursor, without controlling other conditions in the method of preparing the mesoporous silica using hydrothermal synthesis, by itself allows the particle size of the mesoporous silica to be controlled as shown, and further depends on the type of transition metal salt. The particle size can be seen to be the smallest when $Cu^{2+}$ is used as compared to when the other metal salts are used.

EXPERIMENTAL EXAMPLE 5

TEM Analysis

Figure 8:
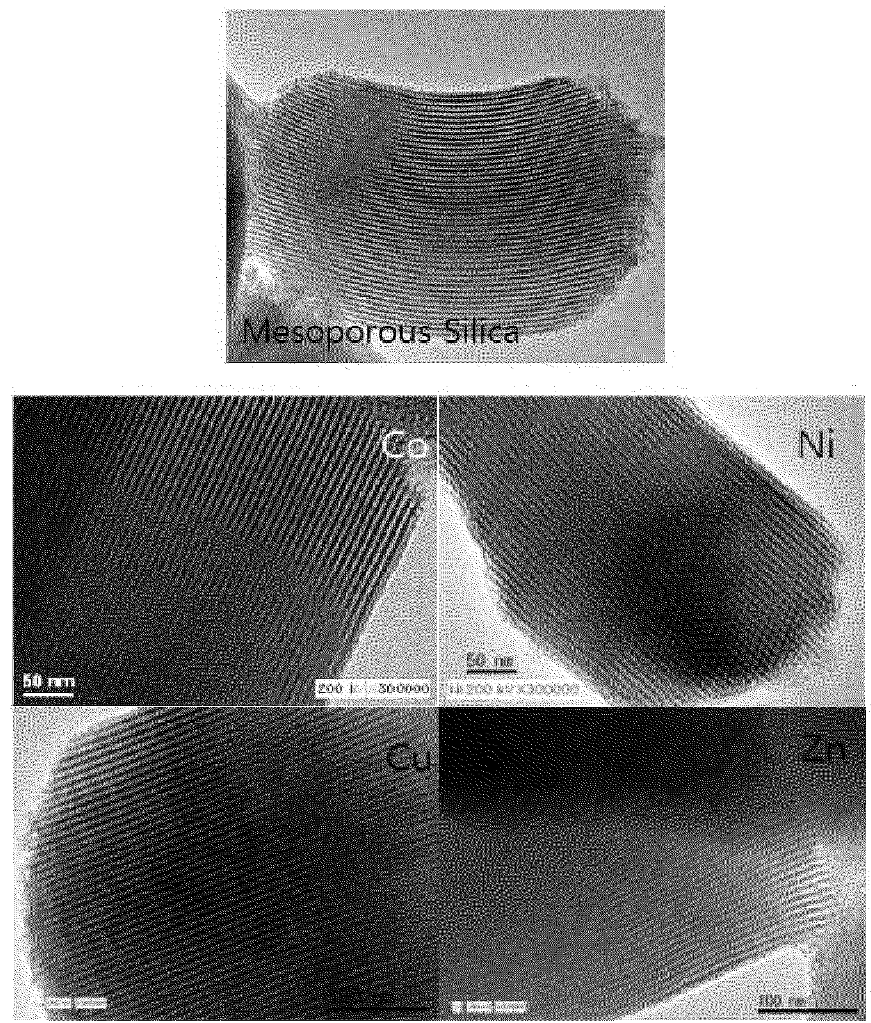
FIG. 8 is of TEM images showing the pore sizes of the metal salt-added mesoporous silicas.

The mesoporous silicas of Examples 1 to 4 and Comparative Example 1 were subjected to TEM analysis. As such, the device used therefor was Jeol JEM-4010 200 kV (TEM Accelerating Voltage: 100-200 kV; Magnification: X60-2,000,000; Minimum spot size: 0.7 nm). The results are shown in FIG. 8. In the drawing, the pore size of the mesoporous silica was about 10 nm, whereas the pore size of the mesoporous silica added with $Co^{2+}$ as the transition metal salt was about 10 nm, the pore size of the mesoporous silica added with $Ni^{2+}$ was about 10 nm, the pore size of the mesoporous silica added with $Cu^{2+}$ was about 10 nm, and the pore size of the mesoporous silica added with $Zn^{2+}$ was about 10 nm. From this, it can be seen that the metal salt has no influence on the pore size of the mesoporous silica.

Figure 9:
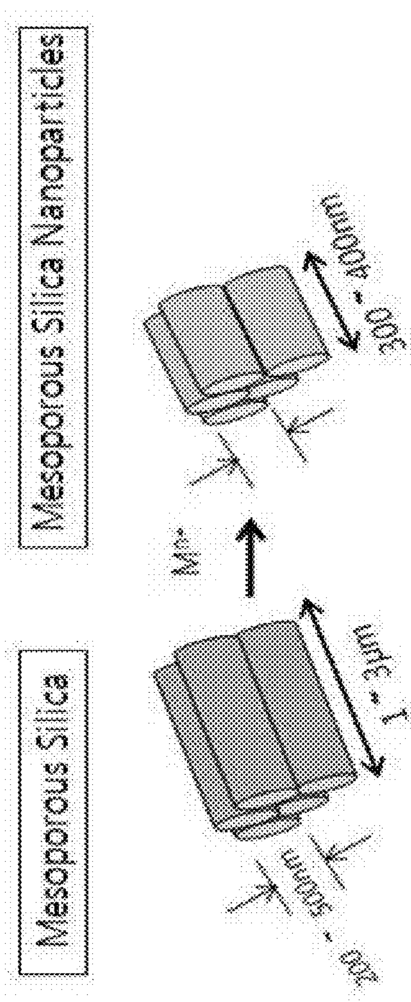
FIG. 9 is a schematic view showing changes in size between the mesoporous silica and the transition metal salt-added mesoporous silica nanoparticles.

FIG. 9 schematically shows changes in size between the mesoporous silica and the transition metal salt-added mesoporous silica nanoparticles.

As described hereinbefore, the present invention provides a method of preparing mesoporous silica nanoparticles. Typically, a porous material used as a catalyst, an adsorbent or a support material has a particle size of about 1-2 μm and a pore size of about 10-30 nm, and thus is capable of selectively adsorbing or separating molecules adapted for the pore size, and has also been employed for modification reactions by supporting a catalytically active material having an inherent acid site. Recently, a porous material is being utilized as a support of various nano materials using pores at the nano level.

When the particle size of such a porous material is nanosized, the rate of diffusion of a material is increased in inverse proportion to a decrease in the particle size, thus increasing reactivity. As well, it is easy to recycle the porous material used as a catalyst, and inactivation thereof is slow. Furthermore, porous nanoparticles advantageously have many applications in sensor and medical fields. Such nano-sized porous materials can be applied to a catalytic reaction of molecules in a nano scale and adsorption/separation of macromolecules such as enzymes or proteins, and can also be used as sensors and optical catalysts. Thanks to a uniform pore structure and specific surface area, the porous nanoparticles can be employed in the immobilization and encapsulation of metals, dyes, polymers, enzymes, and proteins.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of preparing mesoporous silica nanoparticles using hydrothermal synthesis, comprising adding a transition metal salt when reacting a surfactant and a silica precursor in a mixture solution of the surfactant, water, and an acid, wherein molar ratios of the silica precursor to the surfactant are 0.01-0.02.

2. The method as set forth in claim 1, wherein the transition metal salt is a transition metal salt of one or more transition metals selected from the group consisting of titanium, vanadium, chromium, manganese, iron, cobalt, nickel, copper and zinc.

3. The method as set forth in claim 1. wherein the surfactant is a poly(alkyleneoxide)block copolymer.

4. The method as set forth in claim 1, wherein the silica precursor is tetraethylorthosilicate.

5. The method as set forth in claim 1, wherein the reacting of the surfactant and the silica precursor is performed at 30-50° C.

6. The method as set forth in claim 1, comprising:

mixing Pluoronic P123, water and an acid, thus preparing a mixture solution;

adding a transition metal salt to the mixture solution and mixing the transition metal salt and the mixture solution, thus preparing a transition metal salt-added mixture solution;

adding tetraethylorthosilicate to the transition metal salt-added mixture solution and stirring the tetraethylorthosilicate and the transition metal salt-added mixture solution at temperatures of 30-50° C., thus preparing a tetraethylorthosilicate-added mixture solution;

aging the tetraethylorthosilicate-added mixture solution at temperatures of 110-130° C. in a steel pressurizer to obtain a resultant mesoporous silica; and washing the mesoporous silica, drying the washed mesoporous silica at room temperature, and calcining the dried mesoporous silica at a temperature of 550° C.

* * * * *

UNITED STATES PATENT AND TRADEMARK OFFICE
Certificate

Patent No. 8,518,361 B2

Patented: August 27, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeong-Ho Chang, Gyeonggi-do (KR); and Hye Sun Lee, Seoul (KR).

Signed and Sealed this Tenth Day of December 2013.

MELVIN C. MAYES
*Supervisory Patent Examiner*
Art Unit 1732
Technology Center 1700